(12) United States Patent
Miller et al.

(10) Patent No.: US 6,825,887 B2
(45) Date of Patent: Nov. 30, 2004

(54) COLOR COMPONENT SIGNAL INTERFACE CIRCUIT

(75) Inventors: Robin James Miller, Basingstoke (GB); Bruce Ikin, Basingstoke (GB); John Roderick McGaffney, Basingstoke (GB); David Mayes, Basingstoke (GB)

(73) Assignee: Sony United Kingdom Limited, Weybridge (GB)

( * ) Notice: Subject to any disclaimer, the term of this patent is extended or adjusted under 35 U.S.C. 154(b) by 447 days.

(21) Appl. No.: 09/886,314

(22) Filed: Jun. 21, 2001

(65) Prior Publication Data

US 2002/0044223 A1 Apr. 18, 2002

(30) Foreign Application Priority Data

Jun. 23, 2000 (GB) .............................................. 0015438

(51) Int. Cl.[7] .................................................. H04N 9/64
(52) U.S. Cl. ........................ 348/708; 348/707; 348/690
(58) Field of Search ................................ 348/690, 673, 348/371, 678, 686, 708, 707; H04N 9/64, 5/14

(56) References Cited

U.S. PATENT DOCUMENTS

| | | | | |
|---|---|---|---|---|
| 3,735,026 A | * | 5/1973 | Smith et al. ............. | 348/228.1 |
| 4,306,247 A | | 12/1981 | Tomimoto et al. | |
| 4,328,514 A | * | 5/1982 | Nakashima et al. ........ | 348/635 |
| 4,344,084 A | * | 8/1982 | Engel et al. ................ | 348/605 |
| RE32,209 E | * | 7/1986 | Carnt et al. .................... | 348/64 |
| 4,642,694 A | * | 2/1987 | Yamagishi et al. ......... | 348/790 |
| 4,673,970 A | * | 6/1987 | Matsumoto et al. ........ | 348/646 |
| 5,892,555 A | * | 4/1999 | Sohn .......................... | 348/689 |

FOREIGN PATENT DOCUMENTS

GB  2 219 169  11/1989

OTHER PUBLICATIONS

PAJ abstract vol. 015 No. 219 (E1074) & JP 03062794 (Mar. 18, 1991) Toppan Printing Co. Ltd.

* cited by examiner

Primary Examiner—Michael H. Lee
Assistant Examiner—Trang U. Tran
(74) Attorney, Agent, or Firm—Frommer Lawrence & Haug LLP; William S. Frommer; Samuel S. Lee

(57) ABSTRACT

An interface circuit 13 is provided for a display apparatus 3 such as a television. The display apparatus 3 comprises a video signal processing circuit 8 for processing a composite video signal to derive color component signals having variable black and white levels; a linear amplifier 10 for amplifying the color component signals; and a display device 4 such as a CRT driven by the output of the linear amplifier 10. The interface circuit 13 is provided to interface the color component signals with a digital signal processor 14. The interface circuit 13 includes a modification circuit 22 arranged to perform a modification of voltage levels of the color component signals and to output the modified color component signals to the digital signal processor 14 via an A/D convertor 18. The interface circuit 13 further includes a remodification circuit 23 arranged to receive processed color component signals supplied from the digital signal processor 14 via a D/A convertor 19 and to perform a modification of the processed color component signals which is the inverse of the modification performed by the modification circuit 22. The modification and remodification circuits 22, 23 use calibration signals including the black and white levels of the color component signals inserted in a predetermined period in the vertical blanking interval of the color component signal. The interface circuit 13 reduces the resolution necessary in the A/D convertor 18.

36 Claims, 4 Drawing Sheets

COLOR COMPONENT SIGNAL INTERFACE CIRCUIT

TECHNICAL FIELD

The present invention relates to interfacing color component signals having variable black and white levels, for driving a display device after linear amplification, with a digital signal processor. The present invention may be employed in a display apparatus, for example where the display device is a cathode ray tube (CRT).

BACKGROUND

In known types of display apparatus, a received composite video signal, is processed to derive color component signals. The initially derived color component signals have fixed black and white levels, typically 0.7V apart, and are subsequently amplified to derive color component signals each having black and white levels which vary unpredictably and independently. For example, FIG. 1 shows a line of period H of a color component signal comprising a horizontal blanking interval 1 below a black level $V_{black}$ and a signal 2 representing a line of the image. The signal 2 varies between the black level $V_{black}$ and a white level $V_{white}$ depending on the picture content. The black and white levels may be considered as notional levels because the color component signal might or might not reach them on any given line The black level might vary between two limits, typically 0.3V and 3.0V, depending on: the brightness set by the user; the characteristics of the CRT; and a gain control feedback signal that varies the amplifier gain over the lifetime of the CRT to maintain picture quality. The white level might vary between two limits, typically 0.3V and 3.3V above the black level, depending on: the initial drive levels set in the display apparatus for the respective color component signals; the contrast, chroma and hue set by the user; the characteristics of the CRT; and the feedback gain control. Thus the black and white levels of each color component signal output by the video signal processing circuit vary unpredictably and independently from each other.

It is desirable to interface the color component signals which have variable black and white levels with a digital signal processor to perform various types of processing to modify the characteristics of the image. However, in so doing, it is critical to retain the levels of the color component signals supplied to a display device via a linear amplifier to prevent distortion of the color balance in the displayed picture.

Theoretically, the color component signals could be supplied directly to a digital signal processor through an analog-to-digital (A/D) convertor. However, to maintain the necessary accuracy in the levels of the color component signals, the resolution of the system would need to be very high, say around 1 mV. Given that the white level can vary over a range of 6.3V, the accuracy of the A/D convertor would need to be $(1\times10^{-3})/6.3$ or 0.016%. To achieve this accuracy, a 13 bit A/D convertor would be required. However, a 13 bit A/D convertor operating at video frequencies is very difficult with modern integrated circuit technology and cannot currently be achieved using cheap mass production technology. The only suitable 13 bit A/D convertors currently available are unacceptably expensive.

SUMMARY

According to one aspect of the present invention, there is provided an interface circuit for interfacing color component signals, which have variable black and white levels and which color component signals are for driving a display device after linear amplification, with a digital signal processor, the interface circuit comprising: a modification circuit arranged to receive color component signals which have variable black and white levels, to perform a modification of the voltage levels of the received color component signals, and to output the modified color component signals for supply to a digital signal processor via an A/D convertor; and a remodification circuit arranged to receive processed color component signals supplied from the digital signal processor via a D/A convertor, to perform a modification of the processed color component signals which is the inverse of the modification performed by the modification circuit, thereby restoring the voltage levels of the color component signals, and to output the restored color component signals for supply to a display device via a linear amplifier.

Accordingly, the interface circuit is capable of providing a highly accurate representation of the color component signals whilst reducing the resolution necessary in the A/D conversion, because the modification performed by the remodification circuit is the inverse of the modification performed by the modification circuit. For example, in the described embodiment, the A/D convertor may be 8 bit and hence easily implemented, whilst still providing a resolution for the picture content which is adequate for the display device.

Preferably, calibration signals including at least one level fixed relative to the variable black and white levels are inserted in a predetermined period in each color component signal. Then the modification and remodification circuits may be arranged to perform the modifications using the calibration signals. The use of such calibration signals allows a high degree of accuracy to be maintained in the modifications performed in the interface circuit.

The predetermined period in which the calibration signals are inserted may be in the vertical blanking interval, so that the picture displayed on the display device is not disrupted.

Desirably, the calibration signal includes the black level of the respective color component signal, the interface circuit includes a detector for detecting the black levels of the respective color component signals from the calibration signals, the modification circuit is arranged to subtract the detected black levels from the respective, received color component signals, and the remodification circuit is arranged to add the same, detected black levels to the respective, processed color component signals.

By supplying the black levels in the calibration signals, the interface circuit can perform the modifications based on the actual black level, despite variation in that black level over time. Subtraction of the detected black level from the respective color component signals causes each color component signal to be shifted or re-referenced to a constant known level regardless of the actual black level. As the remodification circuit adds the same, detected black level which is subtracted in the modification circuit, any degree of inaccuracy in the detected black level does not affect the restored color component signals.

Preferably, the detector comprises, in respect of each of the color component signals, an analog sample-and-hold circuit controlled to sample the black level of the respective color component signal from the respective calibration signal in said predetermined period and thereafter to hold the black level. This has the advantages of smaller size and higher accuracy over the alternative of an A/D convertor.

Preferably, the sample-and-hold circuits are arranged to sample the calibration signals every predetermined period of the color component signals and the modification and remodification circuits operate in vertical synchronism. In this manner, if there is droop over a vertical period in the detected black level held by the sample-and-hold circuit, there is no effect on the restored color component signals, because the same droop is present in the black level subtracted and added at any given point in the picture.

Preferably, the modification circuit includes a blanking removal circuit arranged to replace the horizontal blanking intervals of the color component signals by the respective detected black levels, and the remodification circuit includes a blanking insertion circuit for re-inserting horizontal blanking intervals into the processed color component signals. Accordingly, the blanking interval of the color component signals, when the signal level is below the black level, is not supplied to the A/D convertor or digital signal processor.

Desirably, the calibration signal includes a scaling level above the black level, preferably at the white level. Then the modification circuit may include, in respect of each color component signals, a scaling circuit arranged to scale the respective color component signal by a respective scaling factor selected using a scaling level in the respective calibration signal to normalise the range between the white and black levels, and the remodification circuit may include, in respect of each color component signal, a re-scaling circuit arranged to re-scale the color component signals by a respective re-scaling factor which is the inverse of the scaling factor used in the respective scaling circuit.

As a result, regardless of the actual white level, the color component signals are scaled to normalise the range between the white and black levels. As the possible range of the color component signals is normalised to a known range, the necessary dynamic range of the A/D convertor is reduced to that known range. As a result, the number of bits of the A/D convertor may be reduced. For example, the range between the white and black levels which is variable between 0.3V and 3.3V may be normalised to 1.0V. The remodification circuit restores the original range by re-scaling the color component signals by a re-scaling factor which is the inverse of the scaling factor.

Preferably, the interface circuit further includes a bypass circuit for passing the received color component signals to the output of the interface circuit, bypassing the modification and remodification circuits, during predetermined horizontal periods of the color component signals when the color component signals consist of color test signals of fixed amplitude relative to the black and white levels.

Color test signals of fixed amplitude relative to the black and white levels may be inserted on predetermined horizontal periods for use by a feedback gain control circuit. The outputs of the linear amplifier derived from the test signals are monitored and fed back as a control signal to the video signal processing circuit to control the gain of the amplifiers which produce the color component signals to compensate for decay in the properties of the display device over its lifetime. The bypass circuit allows the test signals to bypass the modification and remodification circuits, and hence also the digital signal processor. This prevents the test signals from being disrupted in any way. This is highly advantageous, because a high degree of accuracy is needed in the test signals to allow the feedback control to work effectively. Otherwise, a high resolution A/D convertor would have been necessary to maintain the accuracy of the test signals during passage through the interface circuit and the digital signal processor.

According to further aspects of the invention, there are provided corresponding methods of inserting calibration signals in color component signals and interfacing the color component signals with a digital signal processor.

BRIEF DESCRIPTION OF THE DRAWINGS

To allow better understanding, an embodiment of the present invention will be described by way of non-limitative example with reference to the accompanying drawings, in which.

DETAILED DESCRIPTION

Figure 2:
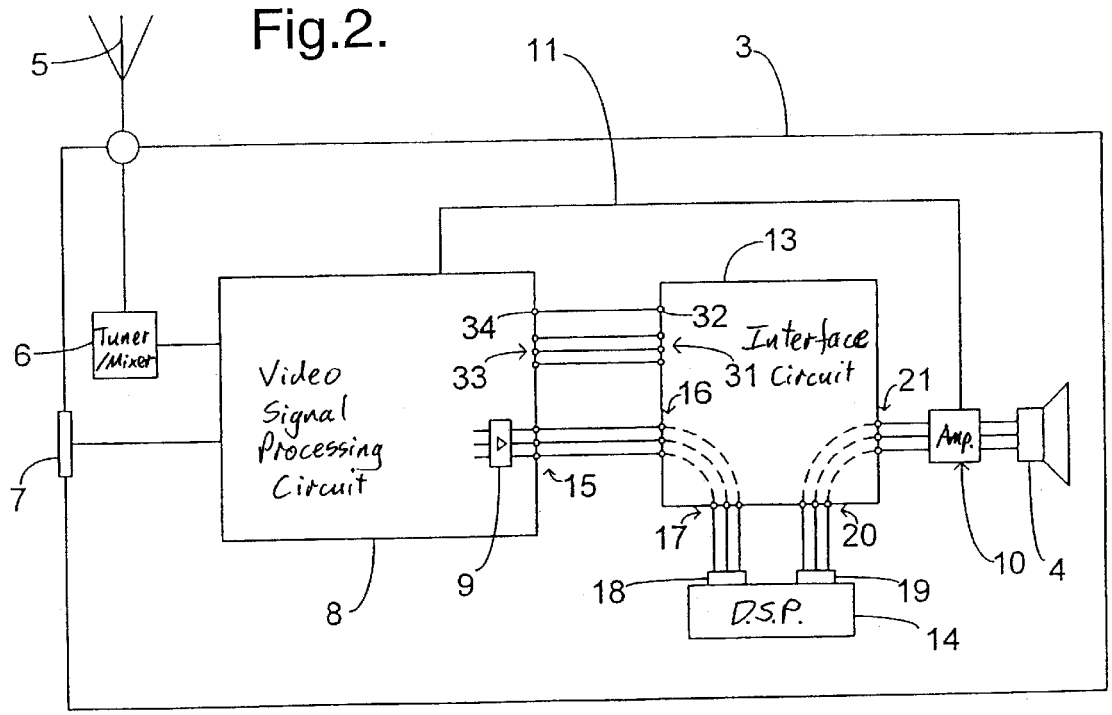
FIG. 2 is a diagram of a television including an interface circuit in accordance with the present invention.

FIG. 2 illustrates an analog television 3 which embodies the present invention and has a cathode ray tube (CRT) 4 as a display device. The present invention is equally applicable to other display apparatuses in which color component signals having variable black and white levels drive a display device such as a liquid crystal display, a plasma discharge panel or a projection television.

The television 3 has a video signal processing circuit 8 which is supplied with a composite video baseband signal (CVBS) from an external aerial 5, through a tuner/mixer circuit 6 for selection of an appropriate channel and frequency conversion to an intermediate frequency. Alternatively, the CVBS is supplied to the television 3 through a SCART socket 7. Selection of the aerial 5 or the SCART socket 7 as the signal source is performed by conventional AV switching circuitry (not shown) in video signal processing circuit 8.

Figure 1:
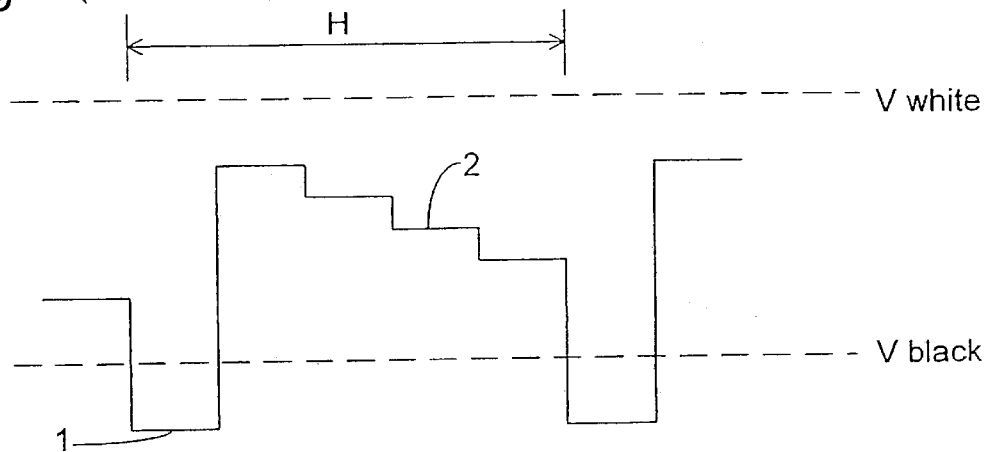
FIG. 1 is a schematic diagram of a line of a color component signal.

The video signal processing circuit 8 processes the CVBS to derive color component signals (R, G and B). The initially derived color component signals have fixed black and white levels 0.7V apart but are passed through an amplifier circuit 9 to produce color component signals each having a variable black level $V_{black}$ and a variable white level $V_{white}$ as illustrated in FIG. 1. The color component signals vary between the black level $V_{black}$ and the white level $V_{white}$ depending on the picture content.

The color component signals are supplied (via an interface circuit 13 described below) to a linear amplifier 10. The amplified color component signals output by the linear amplifier 10 drive the CRT 4.

The amplifier circuit 9 has variable gains controlled independently for each color component signal. The gains of amplifier circuit 9 are dependent on a number of different factors including the picture quality settings set by the user (eg brightness, contrast, chroma and hue) and feedback gain control which is performed as follows.

Figure 3:
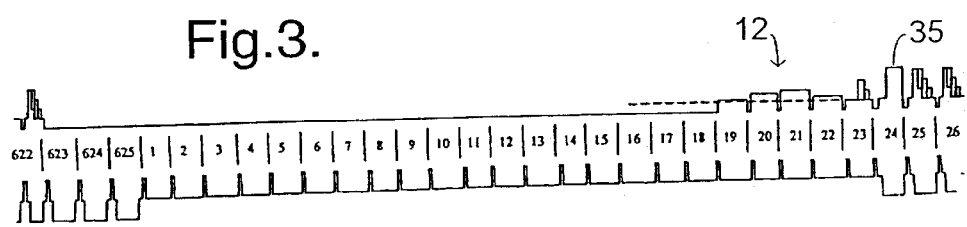
FIG. 3 is a schematic diagram of several lines of a color component signal near the vertical blanking interval in a television in which the present invention is implemented.

The properties of the CRT 4 will decay over its lifetime causing reduction in the electron beam power resulting from a color component signal of a given level. This causes deterioration of the colors of the picture displayed on the CRT 4. Feedback gain control is employed to compensate for this using test signals 12 inserted into the color component signals as illustrated in FIG. 3. The upper waveform of FIG. 3 illustrates the form of the color component signal for lines of a standard PAL television signal. The lower waveform shows the "sandcastle" timing pulse associated therewith. Line nos. 1 to 24 constitute the vertical blanking interval and the picture signal is present on line nos. 25 to 622. The video signal processing circuit 8 inserts test signals 12 on line nos. 19 to 22 in the vertical blanking interval. The test signals 12 have a constant known level across each line and are supplied to the linear amplifier 10 in the normal way.

When the test signals 12 are amplified by the linear amplifier 10, the output drive currents are monitored and fed back to the video signal processing circuit 8 as a feedback gain control signal on line 11. The feedback gain control signal is used to control the gains of the amplifier circuit in respect of each color component signal 9 to maintain a constant drive signal to the CRT 4 for the known test signals. The feedback gain control thereby compensates for any decay in the properties of the CRT 4.

As this feedback gain control maintains the quality of the colors of the picture on CRT 4 over its lifetime, it is critical that the test signals 12 are not disrupted between the video signal processing circuit 8 and the linear amplifier 10. The feedback gain control causes the color of the picture on the CRT 4 to be very sensitive to the changes in the test signals 12.

The elements of the television 3 described above are of a conventional form and so need not be described in further detail.

The video signal processing circuit 8 is implemented as a single integrated circuit chip incorporating circuits (not shown) for numerous functions, including the so-called "video chroma jungle" which derives the color component signals from the CVBS, the AV switching circuitry, the television remote-controller interface and the teletext decoding circuit. In the past, these circuits would have been implemented on separate integrated circuit chips, but more recently there has been a trend towards using a single chip, as in the present embodiment, in order to reduce production and assembly costs. Such single chip video signal processing circuits are commercially available making it cheap and easy to assemble a television.

In order to improve the performance of the television 3 displayed on the CRT 4, it is desirable to process the image displayed on the CRT 4 for example, by re-sealing the image, changing the aspect ratio or enhancing the image. Modem high density digital circuit technology permits such complex operations.

However, the use of a single chip for the video signal processing circuit 8 makes it difficult to modify the video signal. It is not possible to supply the color component signals having fixed black and white levels 0.7V apart to a digital signal processor because these signals are internal to the video signal processing circuit 8 and are only output after amplification by the amplifier circuit 9. Therefore, it is only possible to modify the output color component signals but this is very difficult because the white and black levels vary unpredictably and independently between the color component signals.

It would be conceivable to supply the color component signals output from video signal processing circuit 8 directly to a digital signal processor through only an A/D convertor, with a D/A convertor to convert the processed color component signals back into analog form. However, such an A/D and D/A convertors would need to accommodate the full range of possible voltage levels. As the black level can vary between 0.3V and 3.0V and the white level can vary between 0.3V and 3.3V above the black level, the A/D and the D/A convertors would need to accommodate a dynamic range of 6.3V. Furthermore, it would be necessary for the resolution of the A/D convertor to be high, say 1 mV or better, both to prevent distortion of the color component signals supplied to the linear amplifier 10 and also to retain sufficient accuracy in the conversion of the test signals on line nos. 19 to 22 to allow proper operation of the feedback gain control. This would require the accuracy of the A/D convertor to the 0.016% or better. To achieve this, a 13 bit A/D convertor would be required. To generate a 13 bit A/D convertor that operates at video frequencies is very difficult with modem integrated circuit technology and cannot currently be achieved using cheap mass production technology. Currently, commercially available 13 bit A/D convertors are prohibitively expensive.

To avoid this problem, the television set 3 employs an interface circuit 13 which interfaces the color component signals passed between the video signal processing circuit 8 and the linear amplifier 10 to a digital signal processor 14. In particular, the color component signals output from terminals 15 of the video signal processing circuit 8 are input to terminals 16 of the interface circuit 13 which modifies them and outputs the modified color component signals from terminals 17. The modified color component signals are supplied to the digital signal processor 14 through an A/D convertor 18. The digital color component signals processed by the digital signal processor 14 are output through a D/A convertor 19 to terminals 20 of the interface circuit 13 which re-modifies the processed color component signals with a modification which is the inverse of the modification to restore the original voltage levels of the color component signals. The restored color component signals are output from terminals 21 to the linear amplifier 10.

The digital signal processor 14 may perform any type of image processing of the color component signals. For example, the image processing may change the scaling or the aspect ratio of the image or may alter the image, either to enhance it, for example by noise reduction, or to give a special effect. The exact form of image processing is not important to the present invention so will not be described in detail.

Figure 4:
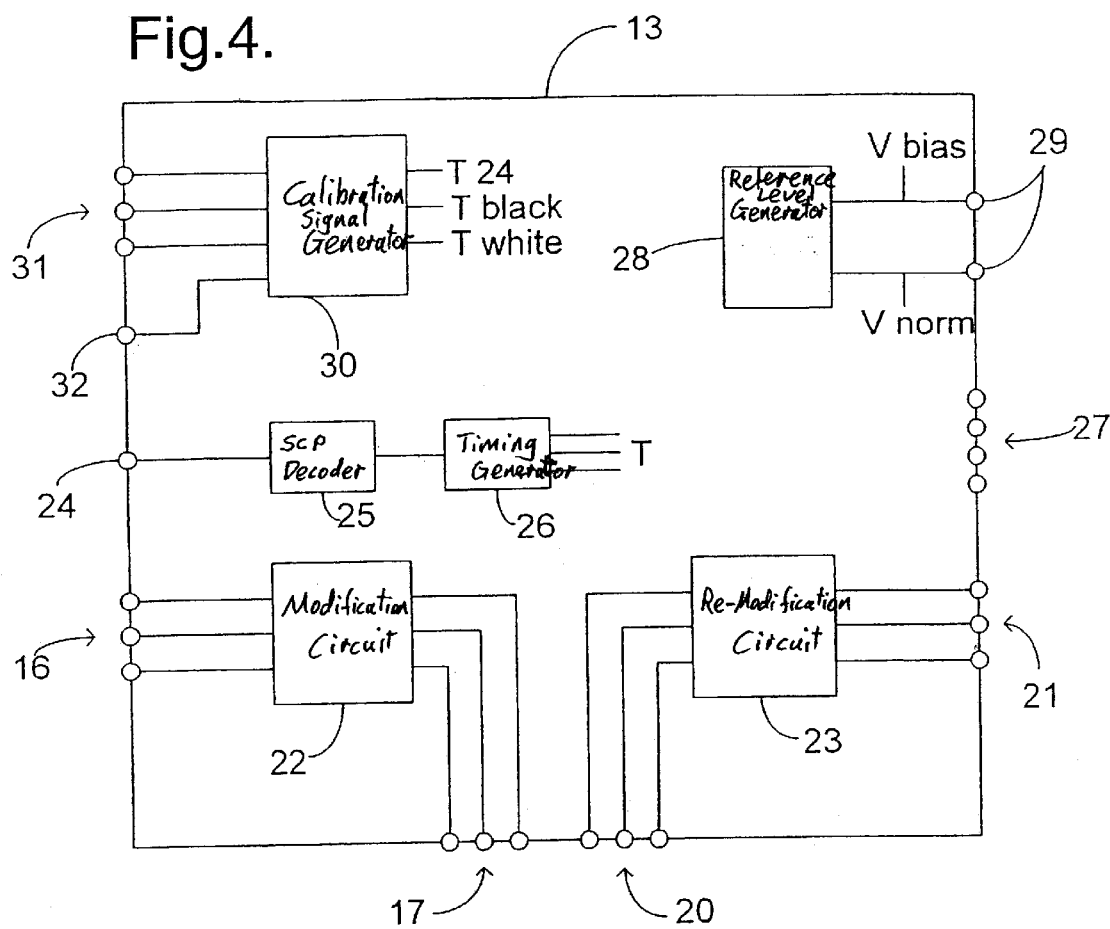
FIG. 4 is a circuit diagram of an interface circuit in accordance in with the present invention.

The interface circuit 13 is illustrated in detail in FIG. 4. The interface circuit 13 is implemented on a single integrated circuit chip allowing the digital signal processor 14 to be easily combined with an otherwise conventional television.

The color component signals input to terminals 16 are modified in a modification circuit 22 and outputs the modified color component signals to terminals 17. The processed color component signals input to terminals 20 are re-modified by re-modification circuit 23 and which outputs the restored color component signals to terminals 21. The interface circuit 13 includes a number of further circuit elements as follows.

The "sandcastle" pulse (SCP) derived from the CVBS by the video signal processing circuit 8 is input through a terminal 24 to an SCP decoder 25 which decodes the SCP to output timing information to a timing generator 26. The timing generator 26 generates a number of timing signals, denoted by the letter T and different subscripts which are used by the various elements of the interface circuit 13. For clarity, the timing signals T will be described in detail later with reference to the circuits which use them.

The interface circuit 13 has power supply terminals 27 which receive a ground and a positive supply for the analog and digital circuit elements from the television 3. As there is no negative supply, the interface circuit 13 includes a reference level generator circuit 28 which generates a positive bias voltage $V_{bias}$, of 2V in the described embodiment. The bias voltage $V_{bias}$ is used by the analog circuit elements of the interface circuit 13 as a biassing offset so that all analog voltage levels are defined as voltages above the bias voltage $V_{bias}$, this being in itself a common technique in television circuits. The generator circuit 28 also outputs a normalisation voltage $V_{norm}$ which is used by the modification and re-modification circuits 22 and 23 as described below. The bias and normalisation voltages $V_{bias}$ and $V_{norm}$ are also supplied to output terminals 29 which are connected to the A/D convertor 18 because they are related to the upper and lower limits of the modified color component signals output from the modification circuit 22 as described below.

The interface circuit 13 has a calibration signal generation circuit 30 supplied, from the timing generator circuit 36, with: a calibration timing signal $T_{24}$ for all of line no. 24 of each vertical period; a black timing signal $T_{black}$ for the first portion of line no. 24; and a white timing signal for the remaining portion of line no. 24. Line no. 24 is in the vertical blanking interval.

Figure 5A:
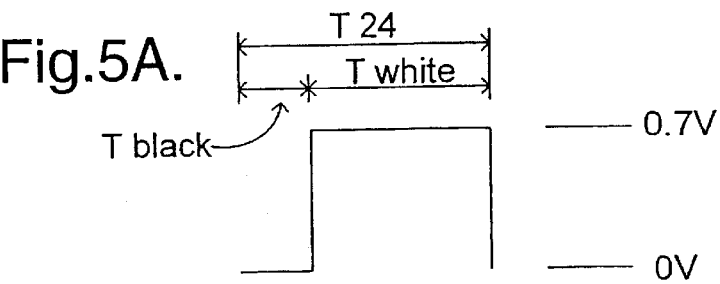
FIG. 5A shows a fixed absolute amplitude calibration signal generated by the interface circuit of FIG. 4.

In response to the calibration, black and white timing signals $T_{24}$, $T_{black}$ and $T_{white}$, the calibration signal generation circuit 30 generates three identical calibration signals which are output to terminals 31 and a control pulse which is output to terminal 32. The generated calibration signals last for the duration of line no. 24 and each take the form illustrated in FIG. 5A. Over the first portion of line no. 24 indicated by black timing signal $T_{black}$ the calibration signals have a level of 0V. Over the remaining portion of line no. 24 indicated by the white timing pulse $T_{white}$ the calibration signals have a level of 0.7V. The control signal output by calibration signal generation signal 30 to terminal 32 is high for the entire period of line no. 24.

The calibration signals output from terminals 31 are supplied to RGB input terminals 33 of the video signal processing circuit 8 and the control signal output from terminal 32 is supplied to an RGB control terminal 34 of the video signal processing circuit 8. RGB terminals 33 are common on single chip video signal processing circuits to allow direct input of RGB signals. When the control signals supplied to control terminal 34 goes high, the video signal processing circuit 8 supplies the signals from RGB terminals 33 through the amplifier circuit 9 to the output terminals 15, in place of the color component signals derived from the CVBS. Thus in response to the control signal output from terminal 32, the calibration signals output from terminals 31 are inserted into the color component signals output from the video signal processing circuit 8 to form output calibration signals 35 shown in FIGS. 3 and 5B.

Figure 5B:
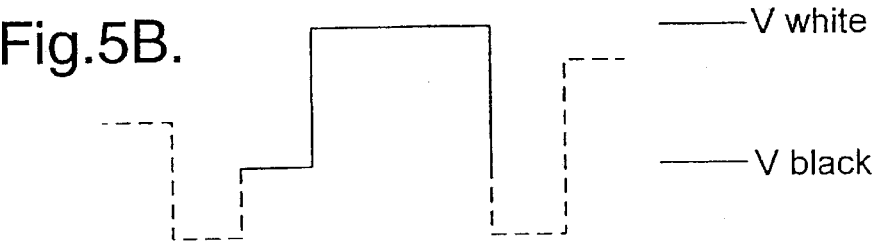
FIG. 5B shows the calibration signal generated by the interface circuit of FIG. 4 and output by the video signal processing circuit of the television of FIG. 2.

Since the calibration signals pass through the amplifier circuit 9, the output calibration signals 35 take the form illustrated in solid outline in FIG. 5B, the adjacent blanking intervals being illustrated in dotted outline. In particular, during the first portion of line no. 24, the output calibration signal is the black level $V_{black}$ of the color component signal. During the remaining portion of line no. 24 the output calibration signal is at the white level $V_{white}$.

Consequently, the calibration signal 35 output from the video signal processing circuit 8 establishes the value of the black and white levels which are not necessarily present in the color component signal and which may vary in accordance with the gains of the amplifier circuit 9. The output calibration signal 35 is used by the modification and re-modification circuits 22 and 23 to modify the color component signals, as follows.

Figure 6:
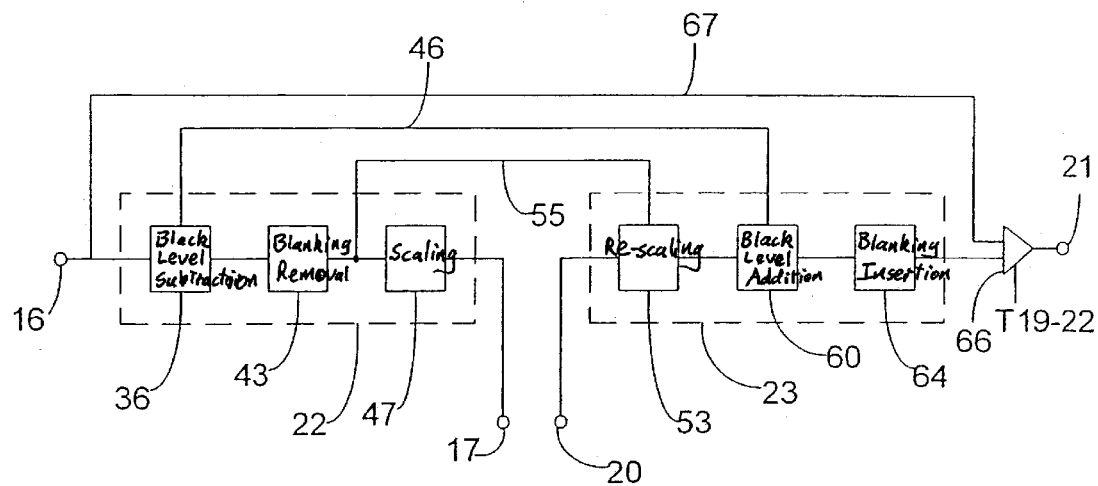
FIG. 6 is a diagram of modification and re-modification circuits of the interface circuit of FIG. 4.

The modification circuit 22 and the re-modification circuit 23 are shown in FIG. 6 for one of the color component signals. The circuitry illustrated in FIG. 6 is replicated for each of the three color component signals.

The color component signal received by terminal 16 is supplied to a black level subtraction circuit 36 arranged to detect the black level of the calibration signal 35 and to subtract the detected black level from the color component signal. The result of this subtraction is that the black level of the color component signal is shifted or re-referenced to a constant level regardless of the variable black level of the received color component signal.

Figure 7:
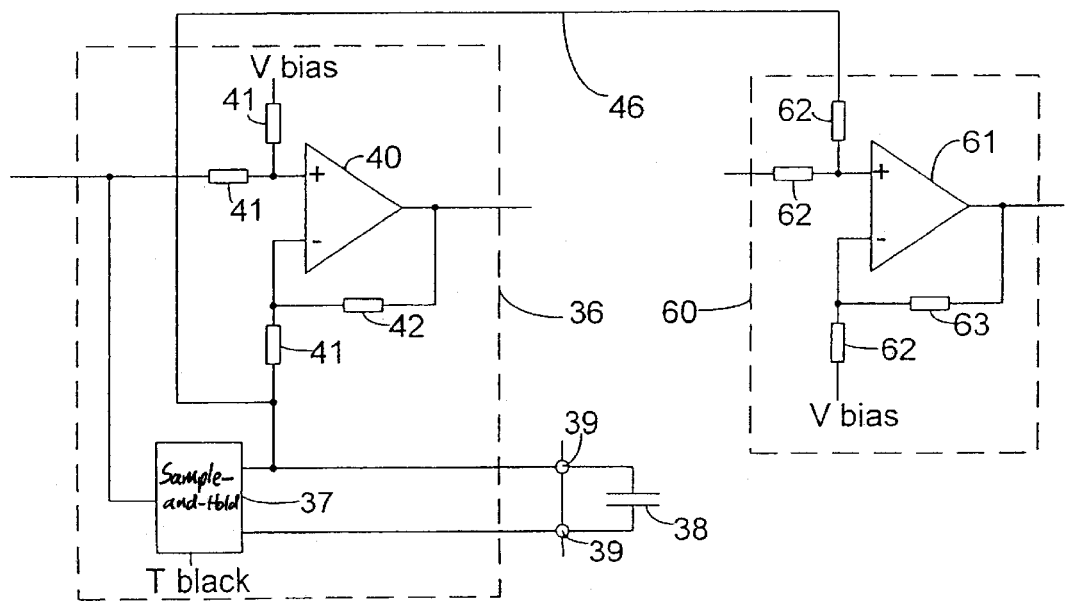
FIG. 7 is the circuit diagram of black level addition and subtraction circuits in the modification and re-modification circuits of FIG. 6.

The black level subtraction circuit is illustrated in detail in FIG. 7. The input color component signal is supplied to a sample-and-hold circuit 37 which includes a capacitor 38 connected externally of the interface circuit 13 through terminals 39. The sample-and-hold circuit 37 is supplied with the black timing pulse $T_{black}$. The sample-and-hold circuit 37 samples the color component signal 36 in response to the timing signal $T_{black}$ and therefore detects the black level in the calibration signal once per field. For the remainder of the field, the detected black level is held by the sample-and-hold circuit 37.

The black level subtraction circuit 36 includes a differential amplifier 40 having the input color component signal supplied to its non-inverting input and the sampled black level held by sample-and-hold circuit 37 supplied to its inverting input. As a result, the differential amplifier 40 subtracts the sampled black level from the color component signal. The bias voltage $V_{bias}$ of the interface circuit 13 is also supplied to the non-inverting input of the differential amplifier 40 as a biassing offset. Identical resistors 41 are included in the input lines to the differential amplifier 40 and a feedback resistor 42 is provided in a negative feedback path between the output and the inverting input of the differential amplifier 40.

The detected black level held by the sample-and-hold circuit 37 is also output on line 46 for use by the re-modification circuit 23, as described below.

Figure 8:
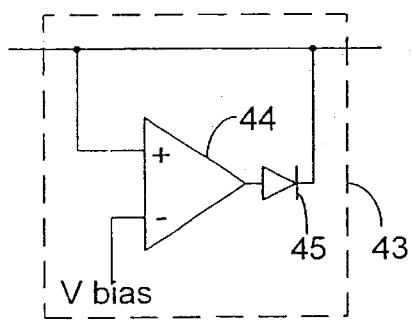
FIG. 8 is a circuit diagram of a blanking removal circuit in the modification and re-modification circuits of FIG. 6.

The color component signal which has been re-referenced by subtraction of the detected black level is passed to a blanking removal circuit 43 arranged to replace the horizontal blanking intervals of the color component signals by the detected black level. As illustrated in detail in FIG. 8, the blanking removal circuit 43 consists of an amplifier 44 which receives the color component signal at its non-inverting input. The output of the amplifier 44 is fed through a diode 45, the output of which is shorted to the non-inverting input of the amplifier 44. The inverting input of the amplifier 44 is supplied with the bias voltage $V_{bias}$ of the interface circuit 13. As the black level subtraction circuit 36 has re-referenced the black level of the color component signal to the bias voltage $V_{bias}$, the blanking removal circuit has the effect of replacing the horizontal blanking intervals of the color component signal, which are lower than the bias voltage $V_{bias}$, with the bias voltage $V_{bias}$ which is the re-referenced detected black level.

As an alternative, it would be possible to replace the blanking removal circuit 43 by a switch actively controlled in response to a timing signal at each of the horizontal blanking intervals, but the passive arrangement of the blanking removal circuit 43 is preferred because of its simplicity.

The color component signal is subsequently supplied to a scaling circuit 47 which scales the color component signal by a scaling factor selected using the white level of the calibration signal. In particular, the scaling factor is selected to normalise the range between the white and black levels.

Figure 9:
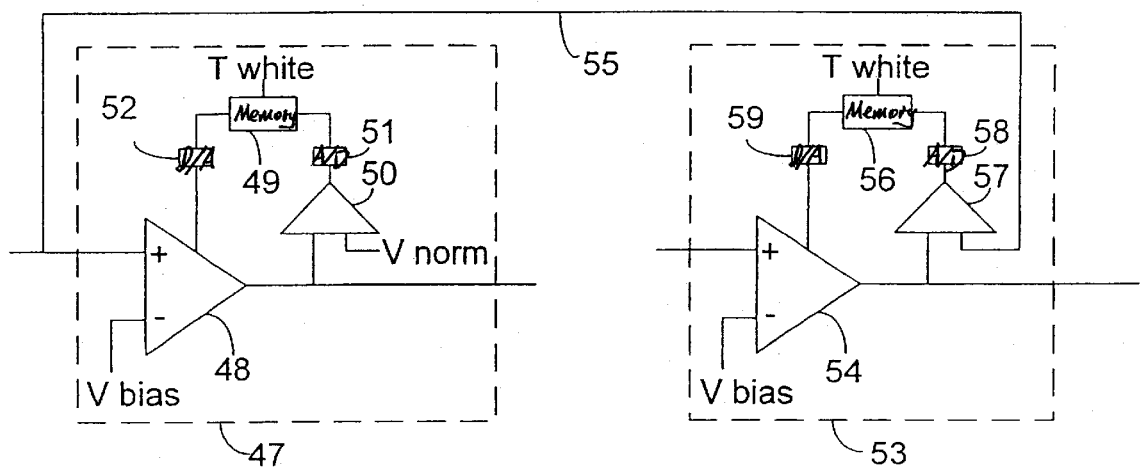
FIG. 9 is a circuit diagram of scaling and re-scaling circuits in the modification and re-modification circuits of FIG. 6.

The scaling circuit 47 is illustrated in detail in FIG. 9. The scaling circuit 47 includes a variable gain amplifier 48 which scales the color components signals applied to its non-inverting input by a scaling factor, ie. the gain of the variable gain amplifier 48. The bias voltage $V_{bias}$ is supplied to the inverting input of the variable gain amplifier 48 as a biassing offset.

The scaling factor of the variable gain amplifier 48 is controlled to normalise the level of the color component signal. The range between the black and white levels is normalised to a constant range, of 1V in the described embodiment. For this purpose, the scaling circuit 47 has a feedback control circuit consisting of a memory 49 and a comparator 50 which together adjust the re-scaling factor of the variable gain amplifier 48 during the timing signal $T_{white}$, when the signal input to the variable gain amplifier 48 is the white level of the calibration signal.

The comparator 50 compares the output of the variable gain amplifier 48, that is the white level of the calibration signal scaled by the scaling factor, with the constant normalisation target level $V_{norm}$ output from the generator circuit 28. The output of the comparator 50 is supplied as a control signal to adjust the scaling factor stored in the memory 49. The memory 49 is controlled by the timing signal $T_{white}$ so that this adjustment is performed only during reception of the white level of the calibration signal. The control signal adjusts the scaling factor stored in the memory 49 until the output of the variable gain amplifier 48 has been scaled to the constant, normalisation target voltage $V_{norm}$ (strictly speaking, the difference between the normalisation target voltage $V_{norm}$ and the bias voltage $V_{bias}$ used as a biassing offset). During the remainder of the vertical period, the memory 49 supplies this same scaling factor to the variable gain amplifier 48.

Of course, the white level in the calibration signal could be replaced by any scaling level above the black level, and at a fixed level relative to the black and white levels, provided that the normalisation target level is adjusted accordingly.

The output of the comparator 50 is supplied through an A/D convertor 51 to supply the control signal as a digital signal. Alternatively, the comparator 50 could output a digital control signal or the memory 49 could respond to an analog control signal. The output of the memory 49 is supplied through a D/A convertor 52 to supply an analog gain control signal to the variable gain amplifier 48, but alternatively the variable gain amplifier 48 could be of a type which is controlled by a digital gain control signal.

The output of the modification circuit 22 fed to terminal 17 is a modified color component signal which is re-referenced to a constant black level regardless of the variable black level of the received signal and is scaled so that the possible range of variation is normalised to a constant range regardless of the variable white level of the color component signal. Both these modifications contribute to reducing the required resolution of the A/D convertor 18. In fact, using both modifications, the A/D convertor may be 8 bit which is easily implemented at low cost.

The re-modification circuit 23 re-modifies the processed color component signals input at terminal 20 using the inverse of the modification performed by the modification circuit 22. This allows the voltage levels of the color component signal to be restored relative to the original black and white levels. This inverse re-modification means that the interface circuit 13 is effectively transparent to the color component signals, thus avoiding reduction in the picture quality.

In particular, the re-modification circuit 23 is constructed as illustrated in FIG. 6. The processed color component signals input at terminal 20 are initially supplied to a re-scaling circuit 53 which scales the color component signals by a re-scaling factor which is the inverse of the scaling factor used in the scaling circuit 47 of the modification circuit 22. Thus, the re-scaling circuit 53 restores the original range of the color component signals between the original black and white levels.

Theoretically, the re-scaling circuit could consist of a variable gain amplifier controlled by the inverse of the scaling factor stored in memory 49 of the scaling circuit 47. However, in practice, it would be very difficult to construct a variable gain amplifier which was inversely linear to the variable gain amplifier 48 across the range of possible re-scaling factors. Therefore, the re-scaling circuit 53 in fact employs its own feedback control circuit which has a similar construction to the feedback control circuit of the scaling circuit 47, as illustrated in detail in FIG. 9.

The re-scaling circuit 53 is illustrated in detail in FIG. 9. The re-scaling circuit 53 includes a variable gain amplifier 54 which scales the processed color components signal applied to its non-inverting input by a re-scaling factor, ie. the gain of the variable gain amplifier 54. The bias voltage $V_{bias}$ is supplied to the inverting input of the variable gain amplifier 54 as a biassing offset.

The re-scaling circuit 53 has a feedback control circuit consisting of a memory 56 and a comparator 57 which together adjust the re-scaling factor of the 30 variable gain amplifier 54 during the timing signal $T_{white}$. At this time, the color component signal received by the interface circuit 13 is the white level in the calibration signal and the signal input to the variable gain amplifier 54 is the white level of the calibration signal modified in the modification circuit 22. Preferably, during the timing signal $T_{white}$, the modified color component signal bypasses the processing in the digital signal processor to achieve the maximum possible accuracy in the selection of the re-scaling factor. Desirably, the bypassing occurs within the digital signal processor so that the modified color component signals pass through the A/D convertor 18 and the D/A convertor 19 to compensate for any inaccuracies in the convertor 18 or 19.

The comparator 57 compares the output of the variable gain amplifier 54 with the actual white level of the calibration signal input on line 55 from the modification circuit 22 prior to scaling in the scaling circuit 47. The output of the comparator 57 is supplied as a control signal to adjust the re-scaling factor stored in the memory 56. The memory 56 is controlled by the timing signal $T_{white}$ so that this adjustment is performed only during reception of the white level $V_{white}$ of the calibration signal. The control signal adjusts the gain of the variable gain amplifier 54 stored in the memory 56 until the output of the variable gain amplifier 54 is restored to the variable white level $V_{White}$. Thus the re-scaling factor is the inverse of the scaling factor. During the remainder of the vertical period, the memory 56 supplies this same re-scaling factor to the variable gain amplifier 54.

The output of the comparator 57 is supplied through an A/D convertor 58 to supply the control signal as a digital signal. Alternatively, the comparator 57 could output a digital control signal or the memory 56 could respond to an analog control signal. The output of the memory 56 is supplied through a D/A convertor 59 to supply an analog gain control signal to the variable gain amplifier 54, but alternatively the variable gain amplifier 54 could be a type which is controlled by a digital gain control signal.

The re-scaled color component signal is supplied to a black level addition circuit 60. The black level addition circuit 60 receives on line 46 the detected black level held by the sample-and-hold circuit 37 of the black level subtraction circuit 36. The black level addition circuit 60 adds the detected black level to the color component signal.

In particular, as illustrated in FIG. 7, the black level addition circuit 60 includes an amplifier 61 arranged as an adder to add the detected black level to the processed color component signal, both signals being supplied to its non-inverting input. The bias voltage $V_{bias}$ is also supplied to the inverting input of the differential amplifier 61 as a biassing offset. Identical resistors 62 are included in each of the input lines to the differential amplifier 61 and a feedback resistor 63 is arranged in a negative feedback path the output and the inverting input of the differential amplifier 61.

Since the detected black level detected by the sample-and-hold circuit 37 is subtracted in the subtraction circuit 36 and is added back in the addition circuit 60, there is no overall effect on the level of the color component signal output from the interface circuit 13. Thus it does not matter if there is any inaccuracy in the detection of the black level $V_{black}$ because any error introduced in the subtraction circuit 36 is removed in the addition circuit 60. In fact, there will inevitably be some error, because the level held by the sample-and-hold circuit 37 will droop over the field period during which it is held. However, the modification and re-modification circuits 22 and 23 operate in vertical synchronism. This is achieved by the processing delay of the digital signal processor 14 being a whole number of vertical periods, preferably a single vertical period. Hence the error at any given point in field introduced by the subtraction circuit 36 because of the droop will be negated by the addition circuit 60 which will add a detected level having the same error caused by droop at the same point in the field.

Figure 10:
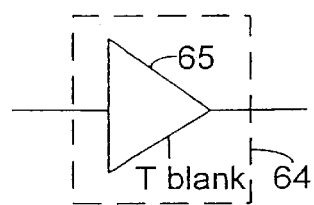
FIG. 10 is a circuit diagram of a blanking replacement circuit in the modification and re-modification circuits of FIG. 6.

Subsequently, the color component signal is supplied to a blanking insertion circuit 64 which re-inserts the horizontal blanking levels into the color component signals. As illustrated in detail in FIG. 10, the blanking insertion circuit simply comprises an amplifier 65 controlled by a blanking timing signal $T_{blank}$ indicating each of the horizontal blanking intervals. In response to the blanking timing signal $T_{blank}$, the amplifier 65 modifies the level of the color component signal to insert a blanking level. This may be any level below the minimum black level of 0.3V as the requirements for a horizontal blanking interval are not strict, provided that it is below the black level.

Optionally, the amplifier 65 of the blanking insertion circuit 64 or the amplifier 61 of the black level addition circuit 60 may blank out the calibration signal 35 so that it is not visible on the CRT 4. This may be achieved by controlling the amplifier 65 or 61 by the timing signal $T_{white}$ or the timing signal $T_{24}$ to output the detected black level in place of the calibration signal 35 or the white level of the calibration signal 35, respectively.

The interface circuit 13 further includes a switch transistor 66 which is supplied with the restored color component signal output by the re-modification circuit 23 and also with the color component signal input to terminal 16 through a line 67 which bypasses the modification and re-modification circuits 22 and 23. The switch transistor 66 is controlled by a test timing signal $T_{19-22}$ which indicates line nos. 19 to 22 of the video signal during which the video signal processing circuit 8 outputs the test signals 12. In response to the test timing signal $T_{19-22}$, the switch amplifier 66 switches the input color component signals received at terminal 16 directly to terminal 21. Thus the test signals on line nos. 19 to 22 bypass the modification circuit 22, the digital signal processor 14 and the re-modification circuit 23. This prevents the test signals 12 from being distorted by the interface circuits 13 of the digital signal processor 14. This prevents any disruption to the feedback gain control performed in the video signal processing circuit 8. Furthermore, it reduces the necessary resolution and accuracy which would have been necessary in the A/D convertor 18 and the D/A convertor 19 if the test signals had passed through the digital signal processor 14.

What is claimed is:

1. An interface circuit for interfacing color component signals which have variable black and white levels and for which color component signals are for driving a display device after linear amplification, with a digital signal processor, the interface circuit comprising:

a modification circuit arranged to receive color component signals which have variable black and white levels, to perform a modification of the voltage levels of the received color component signals, and to output the modified color component signals for supply to a digital signal processor via an A/D convertor; and a remodification circuit arranged to receive processed color component signals supplied from the digital signal processor via a D/A convertor, to perform a modification of the processed color component signals which is the inverse of the modification performed by the modification circuit, thereby restoring the voltage levels of the color component signals, and to output the restored color component signals for supply to a display device via a linear amplifier.

2. An interface circuit according to claim 1, wherein the modification and remodification circuits are arranged to perform said modifications using calibration signals which are inserted in a predetermined period of each color component signal which include at least one level fixed relative to the variable black and white levels.

3. An interface circuit according to claim 2, wherein the predetermined period is in the vertical blanking interval.

4. An interface circuit according to claim 2, wherein
    the interface circuit includes a detector circuit for detecting the black levels of the respective color component signals from the calibration signals,
    the modification circuit is arranged to subtract the detected black levels from the respective, received color component signals, and
    the remodification circuit is arranged to add the same, detected black levels to the respective, processed color component signals.

5. An interface circuit according to claim 4, wherein the detector circuit comprises, in respect of each of the color component signals, an analog sample-and-hold circuit controlled to sample the black level of the respective color component signal from the respective calibration signal in said predetermined period and thereafter to hold the black level.

6. An interface circuit according to claim 5, wherein the sample-and-hold circuits are arranged to sample the calibration signals every predetermined period of the color component signals and the modification and remodification circuits operate in vertical synchronism.

7. An interface circuit according to claim 4, wherein
the modification circuit includes a blanking removal circuit arranged to replace the horizontal blanking intervals of the color component signals by the respective detected black levels, and
the remodification circuit includes a blanking insertion circuit for re-inserting horizontal blanking intervals into the processed color component signals.

8. An interface circuit according to claim 2, wherein
the modification circuit includes, in respect of each color component signals, a scaling circuit arranged to scale the respective color component signal by a respective scaling factor selected using a scaling level in the respective calibration signal to normalise the range between the white and black levels, and
the remodification circuit includes, in respect of each color component signals, a re-scaling circuit arranged to re-scale the color component signals by a respective re-scaling factor which is the inverse of the scaling factor used in the respective scaling circuit.

9. An interface circuit according to claim 8, wherein each scaling circuit includes a variable gain amplifier arranged to scale the respective color component signal.

10. An interface circuit according to claim 9, wherein each scaling circuit further includes a control circuit for adjusting the gain of the variable gain amplifier in response to the scaling level in the calibration signal.

11. An interface circuit according to claim 10, wherein the control circuit comprises a feedback circuit for adjusting the gain of the variable gain amplifier based on a comparison of the output of the variable gain amplifier with a normalisation target level during the predetermined period when the calibration signal is at the scaling level, and a memory for storing the gain of the variable gain amplifier.

12. An interface circuit according to any claim 8, wherein each re-scaling circuit includes a variable gain amplifier arranged to re-scale the respective color component signal.

13. An interface circuit according to claim 12, wherein each re-scaling circuit further includes a control circuit for adjusting the gain of the variable gain amplifier in response to the scaling level in calibration signal.

14. An interface circuit according to claim 13, wherein the control circuit comprises a feedback circuit arranged to adjust the gain of the variable gain amplifier based on a comparison of the output of the variable gain amplifier with the received calibration signal during the predetermined period when the calibration signal is at the scaling level, and a memory for storing the gain of the variable gain amplifier.

15. An interface circuit according to claim 8, wherein the scaling level is the white level.

16. An interface circuit according to claim 2, further including a calibration signal generation circuit arranged to generate during said predetermined period an absolute-amplitude calibration signal having fixed absolute amplitudes for supply to a video signal processing circuit for generation of said first mentioned calibration signal after amplification in the video signal processing circuit.

17. An interface circuit according to claim 1, further including a bypass circuit for passing the received color component signals to the output of the interface circuit, bypassing the modification and remodification circuits, during predetermined horizontal periods of the color component signals when the color component signals consist of color test signals of fixed amplitude relative to the black and white levels.

18. An interface circuit according to claim 1 implemented on a single integrated circuit chip.

19. A display apparatus comprising:
a video signal processing circuit arranged to process a composite video signal to derive color component signals having variable black and white levels;
an interface circuit according to claim 1;
a linear amplifier arranged to amplify the restored color component signals output by the interface circuit; and
a display device arranged to be driven by the output of the linear amplifier.

20. A display device according to claim 19, further comprising:
an A/D convertor arranged to A/D convert the modified color component signals from the interface circuits;
a digital signal processor arranged to process the modified color component signals after A/D conversion by the A/D convertor and to output processed color component signals; and
a D/A convertor arranged to D/A convert the processed, color component signals for supply to the interface circuit.

21. A displace device according to claim 19, wherein the display device is a cathode ray tube.

22. A display apparatus comprising:
a video signal processing circuit arranged to process a composite video signal to derive color component signals having variable black and white levels;
an interface circuit including
a modification circuit arranged to perform a modification of the voltage levels of the color component signals for supply to a digital signal processor via an A/D convertor, and
a remodification circuit arranged to perform a modification of the processed color component signals output from said digital signal processor via a D/A convertor, which is the inverse of the modification performed by the modification circuit, to restore the voltage levels of the color component signals;
a linear amplifier arranged to amplify the restored color component signals output by the interface circuit; and
a display device arranged to be driven by the output of the linear amplifier.

23. A display apparatus according to claim 22, further comprising:
an A/D convertor arranged to A/D convert the modified color component signals from the interface circuits;
a digital signal processor arranged to process the modified color component signals after A/D conversion by the A/D convertor and to output processed color component signals; and
a D/A convertor arranged to D/A convert the processed, color component signals for supply to the interface circuit.

24. A display apparatus according to claim 22, wherein the video signal processing circuit is implemented on a single integrated circuit chip.

25. A display apparatus according to claim 22, wherein the display device is a cathode ray tube.

26. A method of interfacing color component signals for driving a display device after linear amplification, which color components signals have variable black and white levels and have inserted in a predetermined period thereof, calibration signals including at least one level fixed relative to said black and white levels, with a digital signal processor, the method comprising:

modifying the voltage levels of the color component signals using said calibration signals;

supplying the modified color component signals, via an A/D converter and a D/A converter, through a digital signal processor for processing the digital color component signals;

re-modifying the processed color component signals using an inverse modification to that performed in the said step of modifying the voltage levels of the color component levels, to restore the voltage levels of the color component signals;

linearly amplifying the restored color component signals; and driving a display device by the amplified, restored color component signals.

27. A method according to claim 26, wherein the predetermined period is in the vertical blanking interval.

28. A method according to claim 26, wherein the calibration signals include the black level of the respective color component signal, said step of modifying the voltage levels of the color component signals includes detecting the black level in the calibration signals and subtracting the detected black levels from the respective color component signals, and the step of re-modifying the processed color component signals includes adding the same, detected black levels to the detected color component signals.

29. A method according to claim 26, wherein said step of modifying the voltage levels of the color component signals includes replacing the horizontal blanking intervals of the color component signals by the detected black levels, and said step of re-modifying the processing color component signals includes re-inserting horizontal blanking intervals into the processed color component signals.

30. A method according to claim 26, wherein the calibration signals include a scaling level above the black level, said step of modifying voltage levels of the color component signals includes, in respect of each color component signal, selecting a scaling factor to normalise the range between the black and white levels based on said scaling levels in the respective calibration signal and scaling the color component signal by the scaling factors, and said step of re-modifying the processed color component signals includes, in respect of each color component signal, re-scaling the processed color component signal by a re-scaling factor which is the inverse of the respective scaling factor.

31. A method according to claim 30, wherein said scaling level is the white level.

32. A method according to claim 30 wherein said step of selecting a scaling factor is performed using a feedback process to adjust the scaling factor based on a comparison of the scaling level of the calibration signal after scaling by the scaling factor with a target normalisation level.

33. A method according to claim 32, wherein said step of re-modifying the color component signal further includes, in respect of each color component signal, selecting the re-scaling factor based on said scaling level in the respective calibration signal.

34. A method according to claim 33, wherein said step of selecting the re-scaling factor is performed using a feedback process to adjust the re-scaling factor based on a comparison of the scaling level in the calibration signal with the processed color component signal derived from the scaling level of the calibration signal after modification in said step of modifying the voltage levels of the color component signals and re-scaling by the re-scaling factor.

35. A method according to claim 34, wherein during said comparison to adjust the re-scaling factor, the scaling level in the calibration signal bypasses the processing in said digital signal processor, after modification in said step of modifying the voltage levels of the color component signals.

36. A method according to claim 35, wherein the scaling level in the calibration signal, which bypasses the processing in said digital signal processor, is fed through said A/D convertor and D/A convertor.

* * * * *